US006130967A

United States Patent [19]
Lee et al.

[11] Patent Number: 6,130,967
[45] Date of Patent: Oct. 10, 2000

[54] METHOD AND APPARATUS FOR A REDUCED INSTRUCTION SET ARCHITECTURE FOR MULTIDIMENSIONAL IMAGE PROCESSING

[75] Inventors: Shih-Jong J. Lee, Bellevue; Jon W. Hayenga, Kent, both of Wash.

[73] Assignee: Tri Path Imaging, Inc., Redmond, Wash.

[21] Appl. No.: 08/888,120

[22] Filed: Jul. 3, 1997

[51] Int. Cl.[7] ................................................. G06K 9/60
[52] U.S. Cl. .......................... 382/302; 709/251; 710/100; 345/505; 382/304
[58] Field of Search .................................. 382/128, 302, 382/304, 307; 395/800.1, 800.11, 800.16, 800.33; 345/505; 709/251; 710/100; 708/7

[56] References Cited

U.S. PATENT DOCUMENTS

| | | | |
|---|---|---|---|
| 4,850,027 | 7/1989 | Kimmel | 382/49 |
| 5,173,947 | 12/1992 | Chande et al. | 382/41 |
| 5,315,700 | 5/1994 | Johnston et al. | 395/163 |
| 5,361,140 | 11/1994 | Hayenga et al. | 358/446 |
| 5,499,097 | 3/1996 | Ortyn et al. | 356/372 |
| 5,528,703 | 6/1996 | Lee | 382/257 |
| 5,557,097 | 9/1996 | Ortyn et al. | 250/201.3 |
| 5,581,631 | 12/1996 | Ortyn et al. | 382/128 |
| 5,619,428 | 4/1997 | Lee et al. | 364/551.01 |
| 5,621,519 | 4/1997 | Frost et al. | 356/124.5 |
| 5,625,706 | 4/1997 | Lee et al. | 382/128 |
| 5,627,908 | 5/1997 | Lee et al. | 382/137 |
| 5,638,459 | 6/1997 | Rosenlof et al. | 382/133 |
| 5,642,433 | 6/1997 | Lee et al. | 382/199 |
| 5,642,441 | 6/1997 | Riley et al. | 382/255 |
| 5,647,025 | 7/1997 | Frost et al. | 382/255 |
| 5,699,447 | 12/1997 | Alumot et al. | 382/145 |

OTHER PUBLICATIONS

Acharya et al., "Mathematical Morphology for 3–D Image Analysis", 1988 International Conference on Acoustics, Speech, and Signal Processing, pp. 952–955, ©1988 IEEE.

Adelson et al., "Modeling the human visual system", RCA Engineer, 27:6, Nov./Dec. 1982, pp. 56–64.

Adelson et al., "Orthogonal pyramid transforms for image coding", SPIE vol. 845 Visual Communications and Image Processing II (1987), pp. 50–58.

Burt, Peter J., "Fast Filter Transforms for Image Processing", ©1981 by Academic Press, Inc., Computer Graphics and Image Processing, vol. 16, pp. 20–51 (1981).

Burt et al., "The Laplacian Pyramid as a Compact Image Code", ©1983 IEEE, IEEE Transactions on Communications, 31:4, Apr. 1983, pp. 532–540.

Campbell et al., "Application of Fourier Analysis to the Visibility of Gratings", J. Physiol. 1968, 197, p. 551–567.

Esteban et al., "Application of Quadrature Mirror Filters to Split Band Voice Coding Schemes", IBM Laboratory, 06610 La Gaude, France, pp. 191–195.

Gharavi et al., "Application of Quadrature Mirror Filtering to the Coding of Monochrome and Color Images", ©1987 IEEE, pp. 2384–2387.

Lee et al., "A Novel Approach to Real–Time Motion Detection", ©1988 IEEE, pp. 730–735.

Lee et al.., "A Processing Strategy for Automated Papanicolaou Smear Screening", ©The International Academy of Cytology, Analytical and Quantitative Cytology and Histology, 14:5, Oct. 1992, pp. 415–425.

Lee et al., "Adaptive Image Processing Techniques", SPIE vol. 848, Intelligent Robots and Computer Vision: Sixth in a Series (1987) pp. 255–262.

(List continued on next page.)

Primary Examiner—Matthew Bella
Attorney, Agent, or Firm—Hans I. Sun; Emil Moffa; George Leone

[57] ABSTRACT

A reduced instruction set architecture implements complicated image processing algorithms that are decomposed into combinations of simple operations. The simple operations are further decomposed into multiple operations of one dimensional data with an address controller to scan data in a highly flexible fashion for multi-dimensional applications.

17 Claims, 16 Drawing Sheets

OTHER PUBLICATIONS

Lee et al., "Morphologic Edge Detection", ©1987 IEEE, IEEE Journal of Robotics and Automation, vol. RA–3, No. 2, Apr. 1987, pp. 142–156.

Maragos, Petros, "Pattern Spectrum and Multiscale Shape Representation", ©1989 IEEE, IEEE Transactions on Pattern Analysis and Machine Intelligence, 11:7, Jul. 1989, pp. 701–716.

Sternberg, Stanley R., "Grayscale Morphology", Computer Vision, Graphics and Image Processing 35, pp. 333–355 (1986).

Watson, Andrew B., "The Cortex Transform: Rapid Comutation of Simulated Neural Images", Computer Vision, Graphics and Image Processing, 39, pp. 311–327 (1987).

Marr, D. and Hildreth, H, "Theory of Edge Detection," Proc. Roy. Soc. London, vol. B207: 187–217, 1980.

Rosenfeld, A. Ed., "Multiresolution Image Processing and Analysis," New York: Springer–Verlag, 1984.

Serra, J, "Image Analysis and Mathematical Morphology," London: Academic, 1982.

Devijer P., Kittler J: "Pattern Recognition. A Statistical Approach." Prentice Hall, Englewood Cliffs, London, 1982.

Ikeda S., Ochiai, M, Sawaragi, Y. "Sequential GMDH Algorithm and Its Application to River Flow Prediction" IEEE Trans. Syst. Man Cybern. SMC–6(7) :473–479.

Hart P.:"The Condensed Nearest Neighbor Rule." IEEE Transactions on Information Theory 14, 515–516, 1968.

Kohonen T., "The Self–organizing Map." Proceedings of the IEEE 78, 1464–1480, 1990.

Geva S. and Sitte J. "Adaptive nearest neightbor pattern Classification." IEEE Transactions on Neural Networks 2, 318–322, 1991.

Lee, JSJ and Lin, C, "A Pipeline Architecture for Real–Time Connected Components Labeling", Proc. SPIE Advances in Intellige. Robotics Systems, Nov, 1988.

Bartels PH: "Numerical Evaluation of Cytologic Data: VII. Multivariage Significance Tests", Analyt. Quant. Cytol. 3:1–8, 1981.

Breiman et al.:"Classification and Regression Trees", Belmont, California, Wadsworth, 1984.

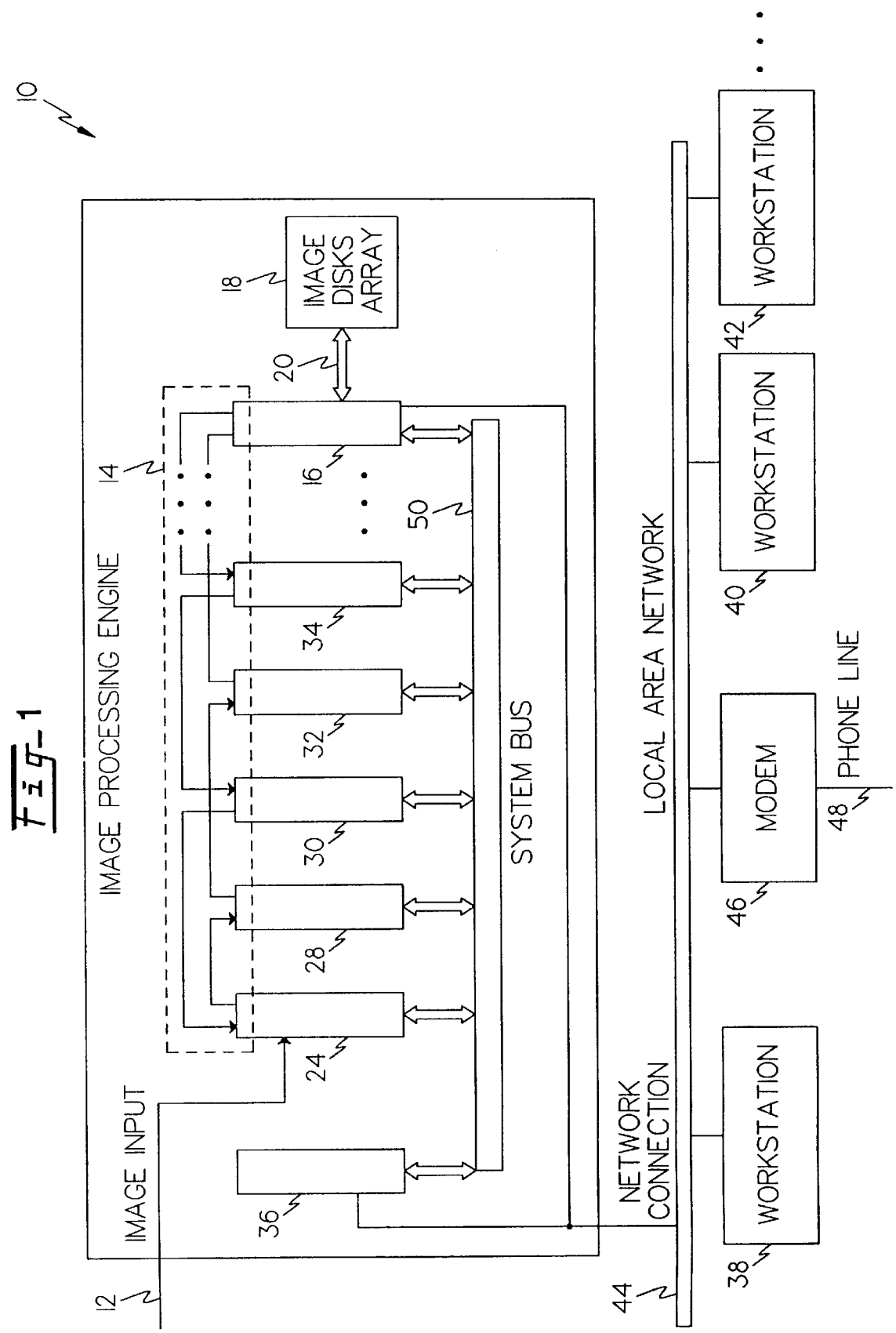

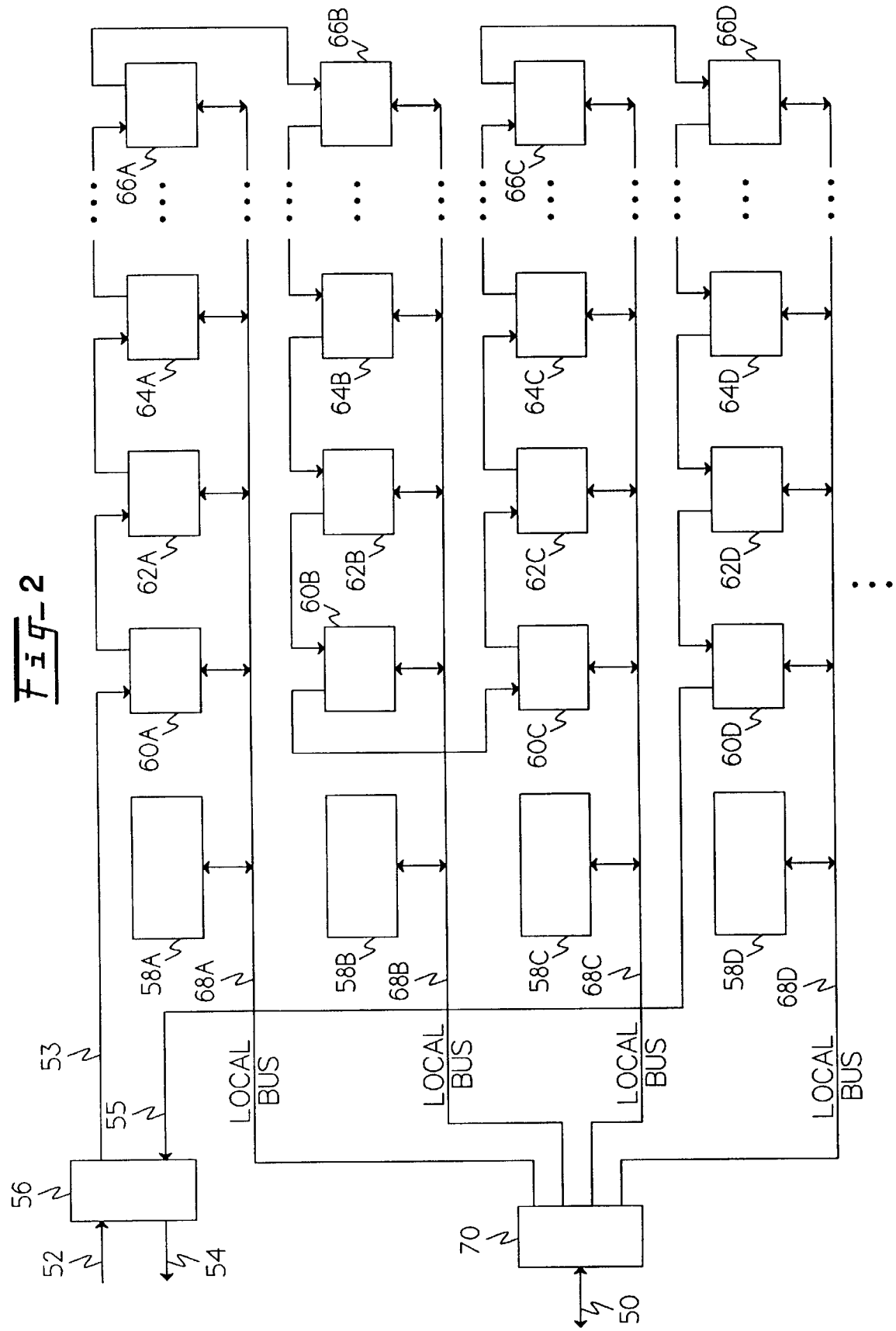

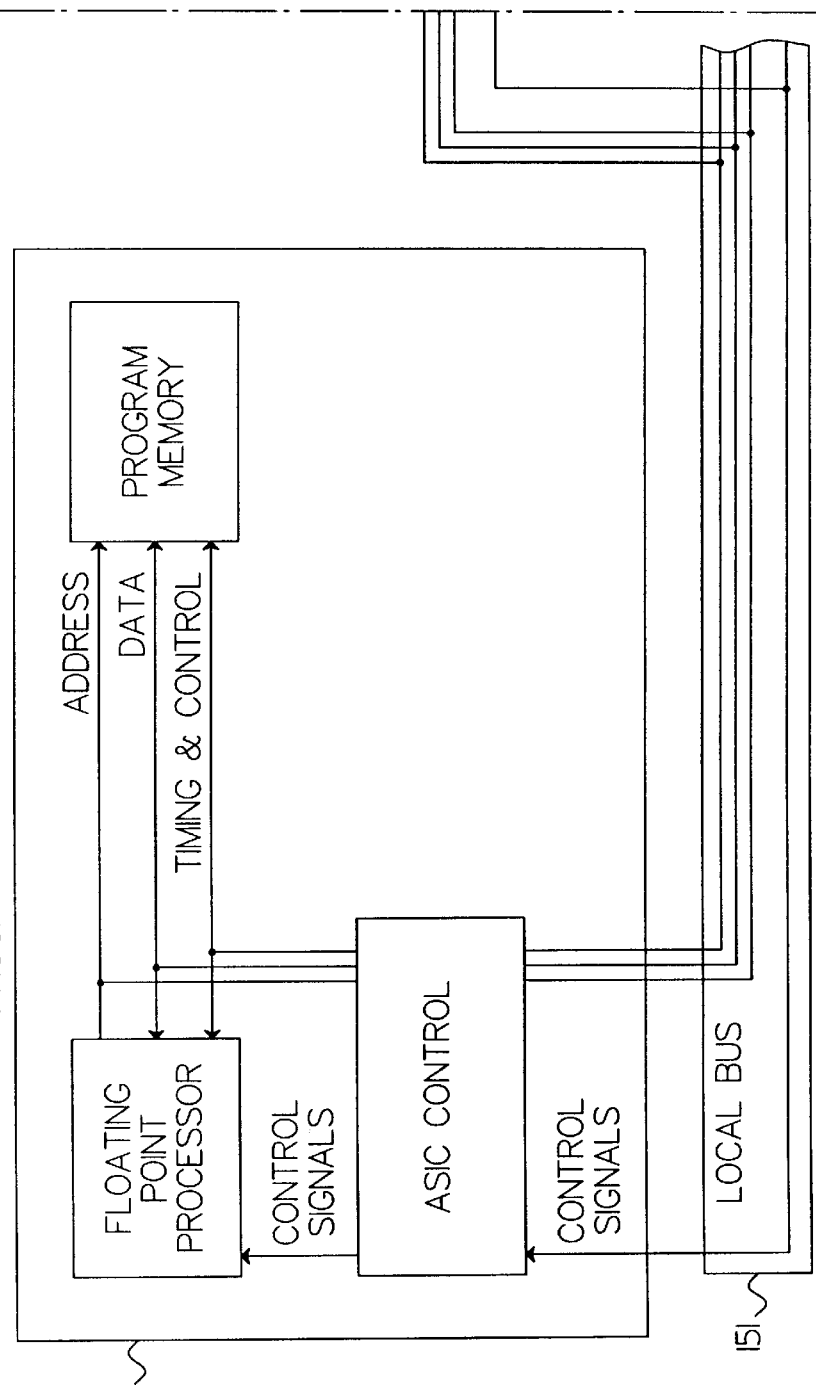

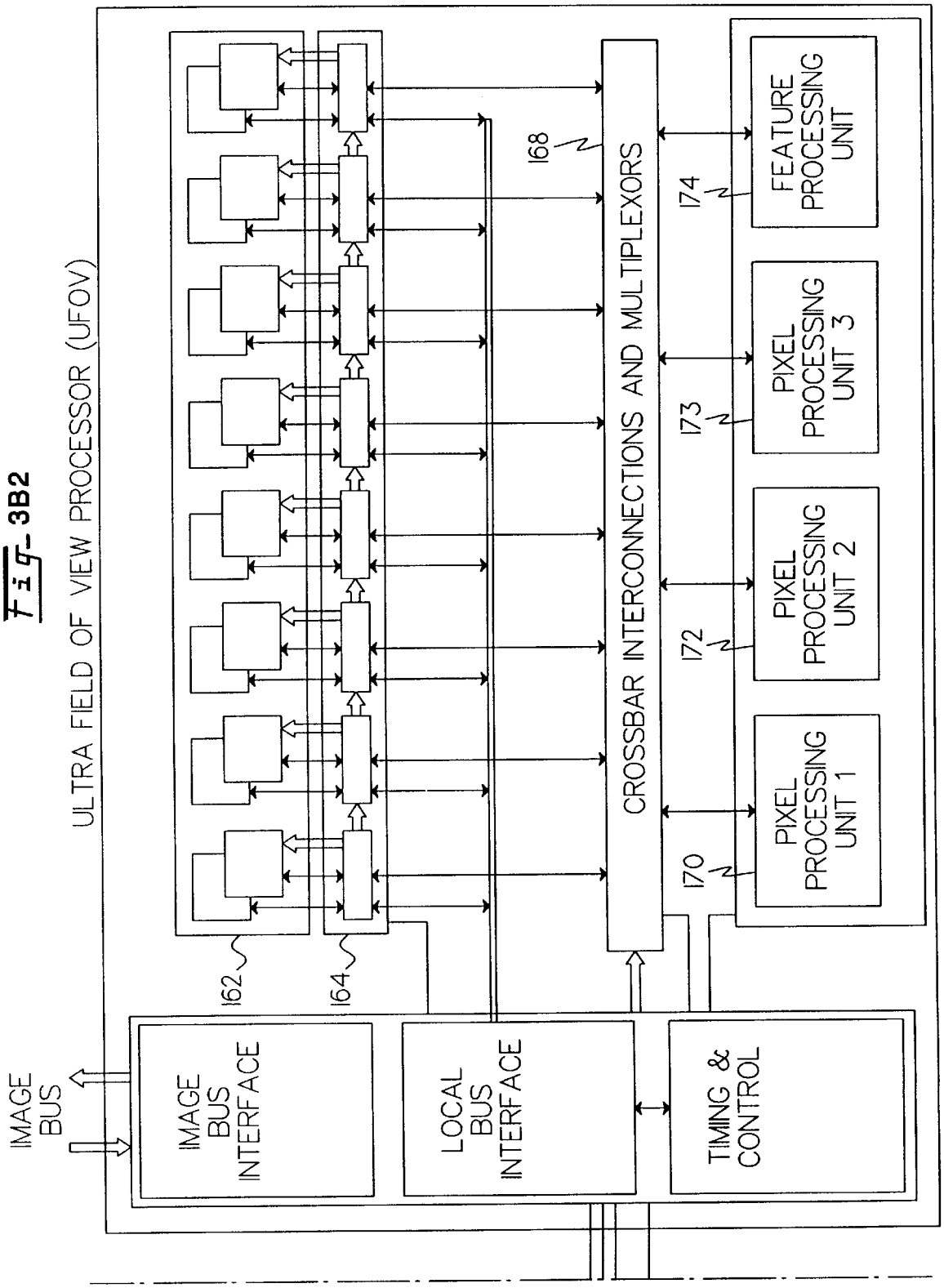
Fig-3B2

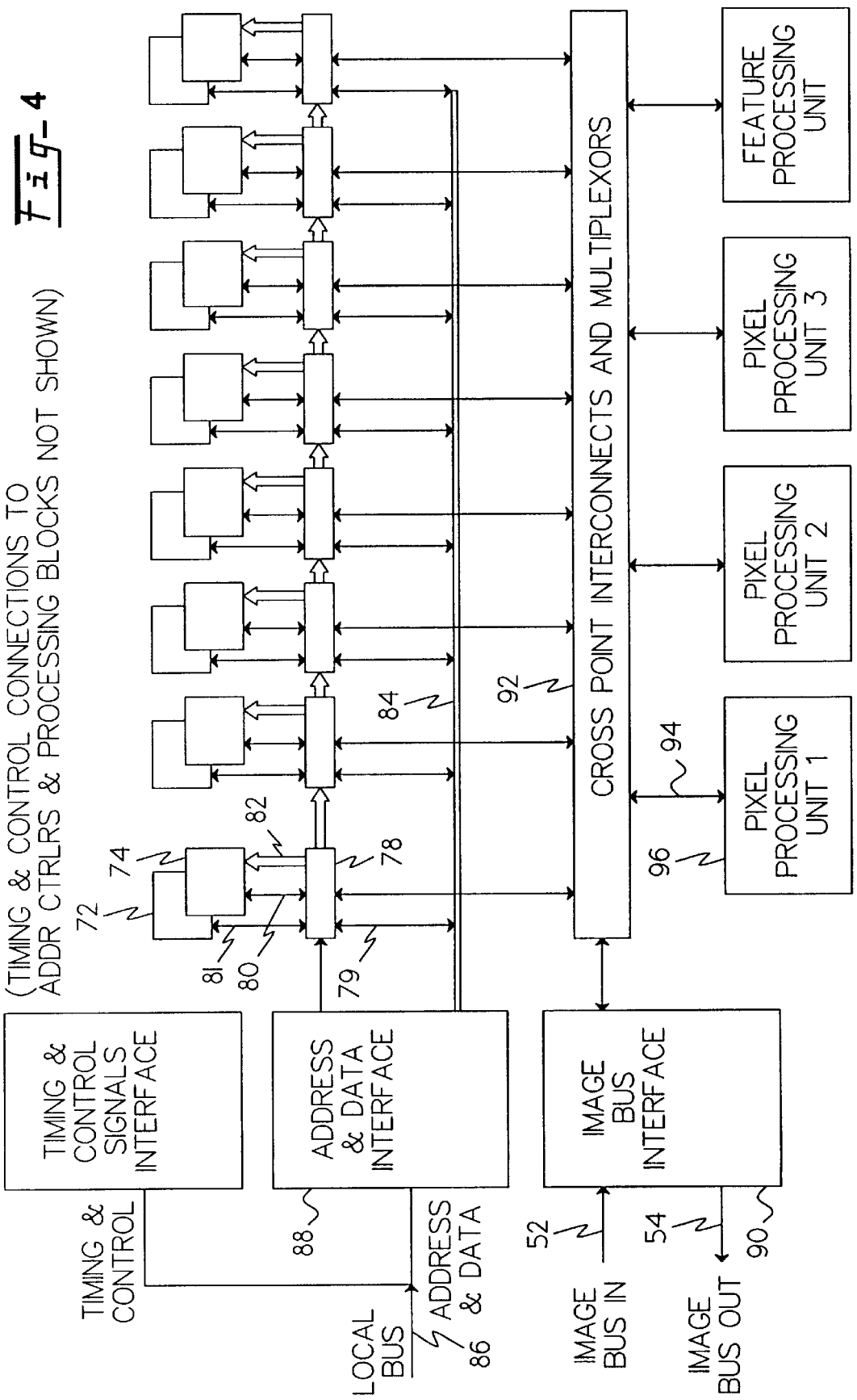

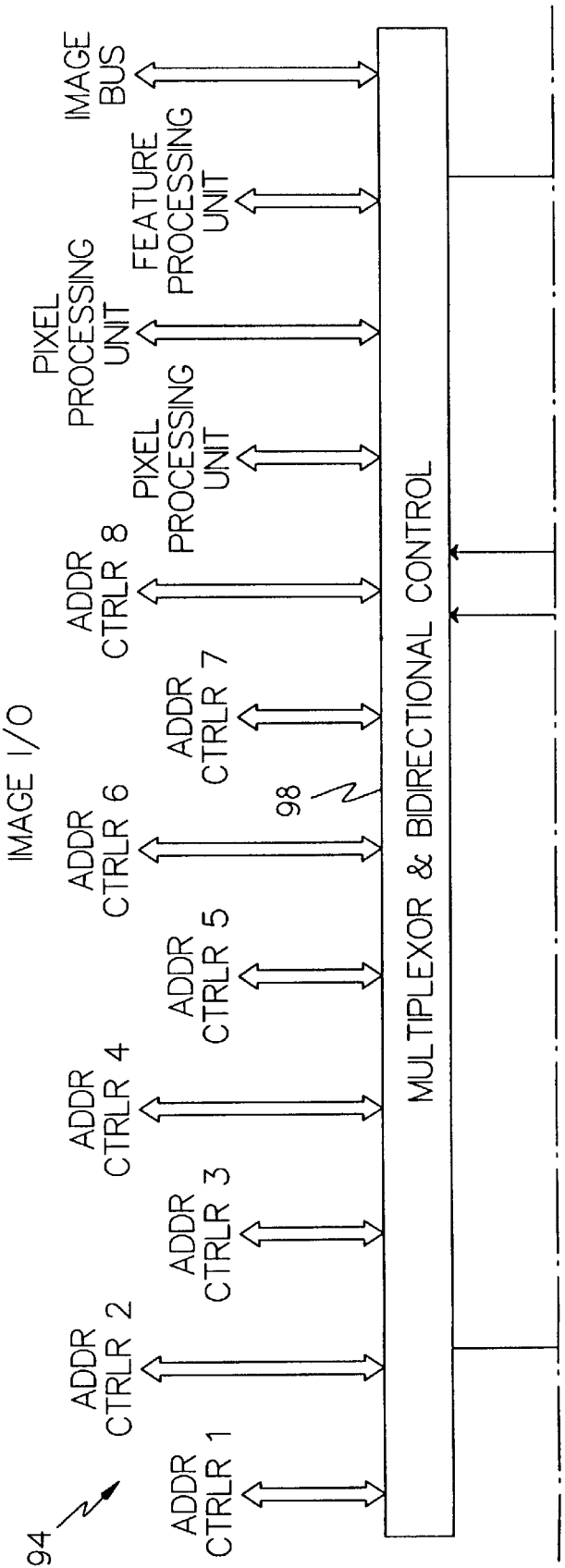

| 280 → | 290 | 291 | 293 |
|---|---|---|---|
| | 1 1 2 2 · · · | 5 5 1 1 · · · | 3 3 3 3 5 5 · · · |
| UNI-DIMENSIONAL SCAN AND FEATURE ACCUMULATION DIRECTION BUT MAY BE | EQUATE (1 & 2) BECAUSE OF ADJACENCY | EQUATE (5 & 1) BECAUSE OF ADJACENCY | EQUATE (3 & 5) BECAUSE OF ADJACENCY |
| | THEREFORE: COMBINE LABELS OR FEATURES 1 & 2 | THEREFORE: COMBINE LABELS OR FEATURES 5 & 1 | THEREFORE: COMBINE LABELS OR FEATURES 3 & 1 |

MOMENT FEATURES ARE COMBINABLE $$M\_c(i,j,k) = \sum\sum\sum L\_p * X^i\_p * Y^j\_p * Z^k\_p$$

p IN COMPONENT C $$m\_c(i,j,k) = \sum\sum\sum X^i\_p * Y^j\_p * Z^k\_p$$

p IN COMPONENT C

Fig-13

Therefore: features or labels representing the outline of a segmented object within an image with moment features can be combined efficiently in using a uni-dimensional scan done in each dimension. By combining the moment based features of centroid, center of mass, volume, average density, integrated density, tilt angle, elongatedness of each feature into the combined moment based features, the combined label moment based features may be derived.

METHOD AND APPARATUS FOR A REDUCED INSTRUCTION SET ARCHITECTURE FOR MULTIDIMENSIONAL IMAGE PROCESSING

The invention relates to a method and apparatus for multidimensional image processing and more particularly to a method and apparatus for using a reduced instruction set architecture to implement multidimensional image processing.

BACKGROUND OF THE INVENTION

There are increasingly more industrial, medical, scientific, and engineering applications requiring image processing of two dimensional, three dimensional, and multidimensional data. In the industrial area, semiconductor wafer inspection and liquid crystal display, LCD, inspection requires high speed two or three dimensional image processing. Examples include the confocal microscope and other imagers. In the medical area, digital three dimension imaging equipment is widely available in hospitals to provide non-invasive imaging of body structure and function. This equipment requires high speed image processing.

Due to the increasingly lower cost and higher speed of video consumer electronics and digital electronic hardware, the current computer image processing technology advances rapidly. Fast processing speed coupled with cheap memory, a high speed bus, and a parallel architecture make many of the computationally demanding two-dimensional imaging applications cost-effective. However, in the arena of multi-dimensional imaging, cost-effective machines are still not available. Furthermore, the drive by semiconductor manufacturers to smaller feature sizes, and the drive by liquid crystal display manufactures to larger panel sizes, continues to place great demands on cost-effective two-dimensional image processing systems. These systems need to meet the ever increasing data volume required for semiconductor wafer inspection and LCD inspection.

A multidimensional architecture can be as simple as a direct extension from a prior art two dimensional architecture. However, the hardware required to implement this approach increases exponentially. For example, while a 3 by 3 convolution requires 9 computational elements and two line delays in a two dimensional implementation, implementation of a 3 by 3 by 3 convolution takes 27 computational elements and two frame delays. This exponential increase in complexity prohibits cost-effective implementation of three dimension, and higher dimension, image processing algorithms in real-time applications.

SUMMARY OF THE INVENTION

This invention greatly reduces the complexity of real-time multidimensional image processing hardware requirements. The invention also can enhance the cost and speed of the current two dimensional image processing architecture to meet the image processing requirements of automated semi-conductor wafer inspection and LCD inspection. The invention provides a Reduced Instruction Set, RIS, architecture. In this architecture, complicated image processing algorithms are decomposed into combinations of simple operations. The simple operations are further decomposed into multiple operations of one dimensional data with an address controller to scan data in a highly flexible fashion for multidimensional applications. Thus, only the hardware required to implement one dimensional processing is required to implement multidimensional image processing.

The invention provides an image processing apparatus comprising a host computer, a plurality of field of view processors and a system bus to connect the computer and the plurality of field of view processors. An imaging means acquires an image connected to an input interface and image reformatter wherein the image interface is also connected to the system and a high speed image bus ring for connecting the plurality of field of view processors via the image interface and the image disk interface, wherein the field of view processors perform multidimensional image processing.

The invention further comprises a means for filtering and image transformation wherein the image transformation performs a coefficient controlled operation.

The invention further provides an image disk interface connected to the system bus. The invention further provides a means for processing the iterative delay operation filter.

The invention further provides a means for processing the iterative delay addition filter. The invention further provides a means for processing the iterative delay subtraction filter.

The invention further provides a means for processing the iterative delay maximum filter. The invention further provides a means for processing the iterative uniform filter.

The invention further provides that each one of the field of view processing modules comprises a plurality of pixel processing units connected through a cross point interconnective multiplexer to a plurality of image buffer memories.

The invention further provides that the pixel processing unit comprises a mask and a thresholded image pixel processor having filter processing and transform processing.

The invention provides a field of view processor comprising a first multiplier for multiplying a first image input signal by a first coefficient and a second multiplier for multiplying a second coefficient by a second image input signal. A third multiplier multiplies a third constant by the first image input signal. A fourth multiplier multiplies a fourth constant by the second image input signal and a summer sums the output of a first multiplier and a second multiplier and a first constant, and a second summer sums the output of the third multiplier and the fourth multiplier and a second constant.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 1 shows a system block diagram of an implementation of the Reduced Instruction Set Architecture for high throughput image processing.

FIG. 2 shows a block diagram of the field of view modules implementing the several RIS image processing architectures per floating point unit and Application Specific Integrated Circuit (ASIC) controller.

FIG. 3B shows a schematic diagram of the apparatus of the invention.

FIG. 4 shows the DRAM ASICs block diagram.

FIG. 13 shows a method for combining labels and features in a one dimension scan axis.

DETAILED DESCRIPTION OF THE PREFERRED EMBODIMENT

Figure 3A:
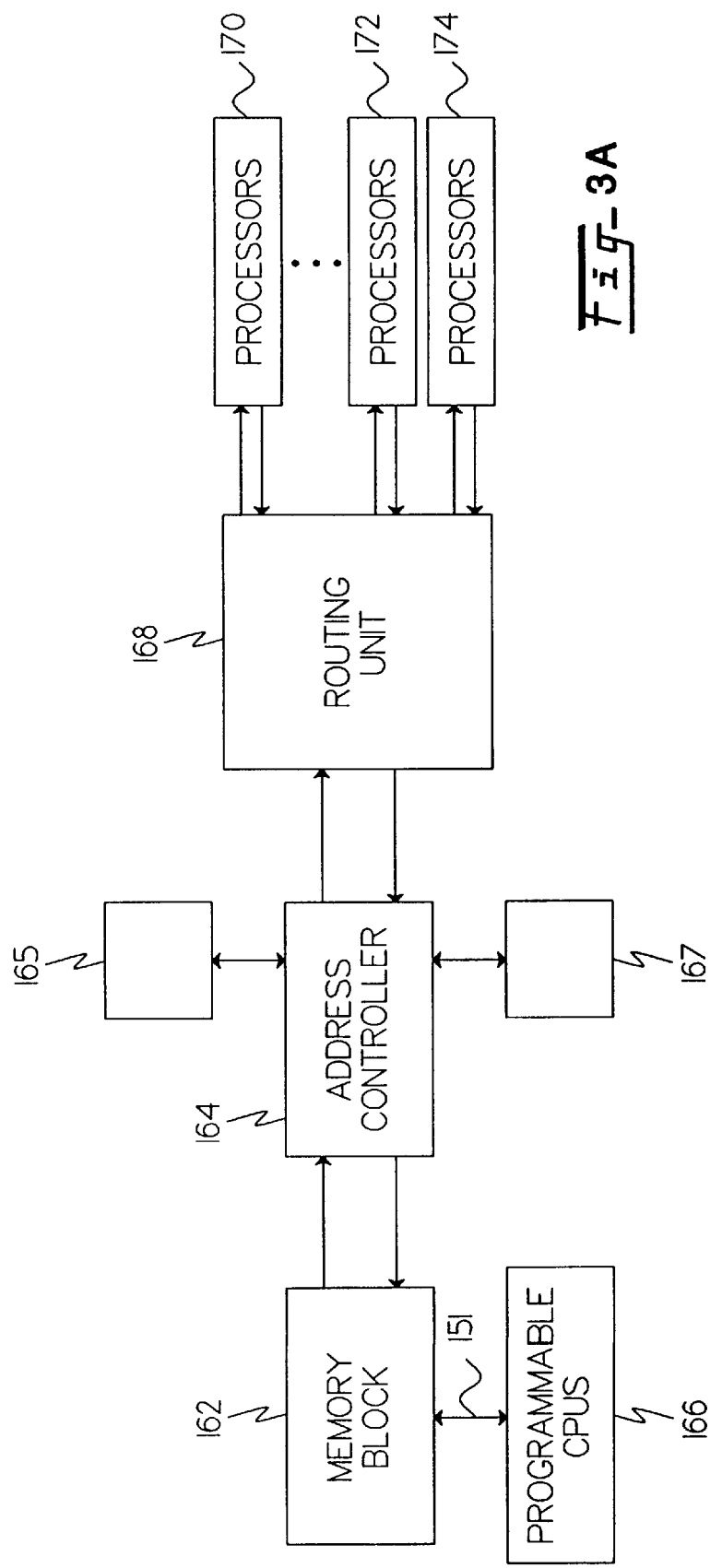
FIG. 3A shows a high level conceptual block diagram of the RIS implementation in FIG. 2.

Refer now to FIG. 1 which shows the image processing engine of the invention. Image processing engine 10 comprises a host computer 36 attached to a system bus 50. Also attached to the system bus 50 is an image bus with image interface 24. The image input comprises 32 channels of image data at 20 Mhz, in one example. The input image can be from any conventional source such as a CCD camera or an automated Scanning Electron microscope (SEM). The image interface 24 comprises image bus transmission lines and performs timing functions and image reformatting. The image interface 24 is attached to the system bus 50. The field of view processors 28, 30, 32 and 34 are also connected to the system bus 50. An image disk interface 16 is also connected to the system bus 50. The image disk interface 16 is also attached to the small computer system interface 20 to a disk array 18. An image bus ring 14 that can transfer one billion pixels per second interfaces the image interface 24 with the image processing modules 28, 30, 32 and 34, as well the image disk interface 16. The image bus ring 14 enables high speed communication between image processors and the disk arrays 18. The host computer 36 controls the operation of each of the image processing modules 28, 30, 32 and 34, as well as the image disk interface 16. The host computer is also connected to a network connection 44 which allows workstations 38, 40 and 42 to communicate with each other and the host computer 36. A modem 46 attached to a local area network 44 allows data to be shared remotely over a phone line 48. Any number of work stations may be attached to the local area network 44 in a conventional manner. The image of a semiconductor wafer or Liquid Crystal Display (LCD) device is provided through image input 12. Image input 12 is connected to the image interface 24.

Now refer to FIG. 2 which shows the architecture of the field of view modules 28, 30, 32, and 34 in more detail. The system bus 50 interfaces to the local buses through interface 70. The local buses 68A–68D connect the various processing units 58A–58D to associated processor/memories, 60A–60D through 64A–64D. Bus transceiver 56 accepts the image bus input 52 and provides an image bus output 54. Bus transceiver 56 also provides an image bus input to the processor/memories which are modules employing a dynamic random access memory and an application specific integrated circuit, combined on a single silicon substrate of the DRAM/ASICS. The processing units 58A–58D further comprise floating point units and an ASIC controller interface to the local buses 68A–68D. The DRAM ASICS 60A–60D through 64A–64D interface through local buses 68A–68D. A parallel architecture exists for multiple local bus channels. There are any number of floating point controllers in the architecture. The last stage of processing 66A interfaces to the next stage 66B in a daisy chain fashion. The image bus output 55 is provided from a last DRAM ASICS 60D. The floating point processing unit and the ASICS controller 58D provides control over the DRAM ASICS.

The local bus is considered to contain all of the necessary data, address, interrupt, synchronization/timing, and control signals required for communication between the Floating Point processing Unit & ASIC Controller, and the UFOV DRAM ASICs 60A–60D through 64A–64D. The local bus also contains all of the necessary data, address, interrupt, synchronization/timing, and control signals required for communication to the host processor (36) via the system/local bus interface (70).

The UFOV DRAM ASIC is controlled by accessing memory mapped registers which control the routing and operations performed on selected memory blocks. This program control is provided by the Floating Point Processing Unit and ASIC controller block, which comprises a processor, program memory and state machine logic necessary for efficiently accessing the UFOV DRAM ASICs. Each Floating Point Processing Unit and ASIC controller block controls several UFOV DRAM ASICs. All of the image RAM and image processing occurs in the ASICs. The conditional data dependant decision making concerning what operations or which branch of operations to perform next is determined by the Floating Point Processing Unit and ASIC controller block.

Refer now to FIGS. 3A and 3B which show a system architectural diagram of the invention to process images and a memory block 162 connected to programmable CPUs 166 through bus 151. The memory block 162 also provides address controller 164 with data. The address controller 164 also provides an address to memory block 162. The address controller 164 provides an address to routing unit 168. Routing unit 168 is in turn connected to send data to the address controller 164. Routing unit 168 receives and sends data to processors 170, 172, 173 and 174.

Address controller 164 controls the scanning of data from and to the memory blocks 162. The address controller 164 also performs geometric transformations between an input image 165 and an output image 167. The routing unit 168, in one embodiment, is a cross-bar switch that provides flexible routing between memories, in memory block 162, and among processors 170, 172 and 174. One example of a routing system is the multiplexed input system shown in U.S. Pat. No. 5,315,700, entitled "Method And Apparatus For Rapidly Processing Data Sequences" to Johnston et al., which is hereby incorporated by reference thereto. The processors 170, 172, 173 and 174 employ a reduced instruction set, RIS, architecture. The processors 170, 172, 173 and 174 execute operations that can be organized to construct complicated image processing functions in a pipeline fashion. The processor organization allows operations to be scanned over an image by suitably configured shift register delays. In the architecture of the invention, each processor has each of its processing elements specialized for different image processing functions. Because all images processed in the RIS architecture of the invention pass through the same pipeline of processing functions, the architecture of the invention superimposes a structure of iterative procedures on image processing operations. In addition, one or multiple programmable central processing units, programmable CPUs 166, are designed to access the memory block 162 and perform functions that are not supported by the processors 170, 172, 173 and 174. The programmable CPUs 166 can be either a general purpose processor, a reduced instruction set computer, RISC, processor or digital signal processor, DSP, or other computer employing a programmable architecture.

Now refer to FIG. 4 which shows the DRAM ASICS block diagram in more detail. The image bus in 52 and image bus output 54 interface to image bus 90 which relays data to a cross point interconnector multiplexer 92. The cross point interconnector multiplexer 92 connects data from a plurality of pixel processing units. Pixel processing unit 96 connects to cross point multiplexer 92 through data line 94. While three pixel processing units are shown, those skilled in the art will recognize that more pixel processing units can be used. Local data bus 86 connects to address and data interface 88. Local data bus 86 connects data and address lines 79 to address controller 78. Address controller 78 controls address 82 that provides an address to image memory buffer-low 74. Data is transferred on line 80 from address controller 78 and also to the image memory buffer-hi 72. Data for the image memory buffer-hi 72 is provided on data line 81. The invention provides parallel structure for a total of eight address controller/image buffer memory sets. Those skilled in the art will recognize that more or less address controller/image buffer memory sets may be used. The cross point interconnect multiplexer 92 connects data from any image buffer to any pixel processing unit and from any pixel processing unit to any other pixel processing unit, and connects the image bus to any image buffer via its address controller. The local address bus 86 interfaces through the address and data interface 88. An address controller bus 84 provides local bus addresses and image data to and from image buffer memory via the local bus.

Figure 5B:
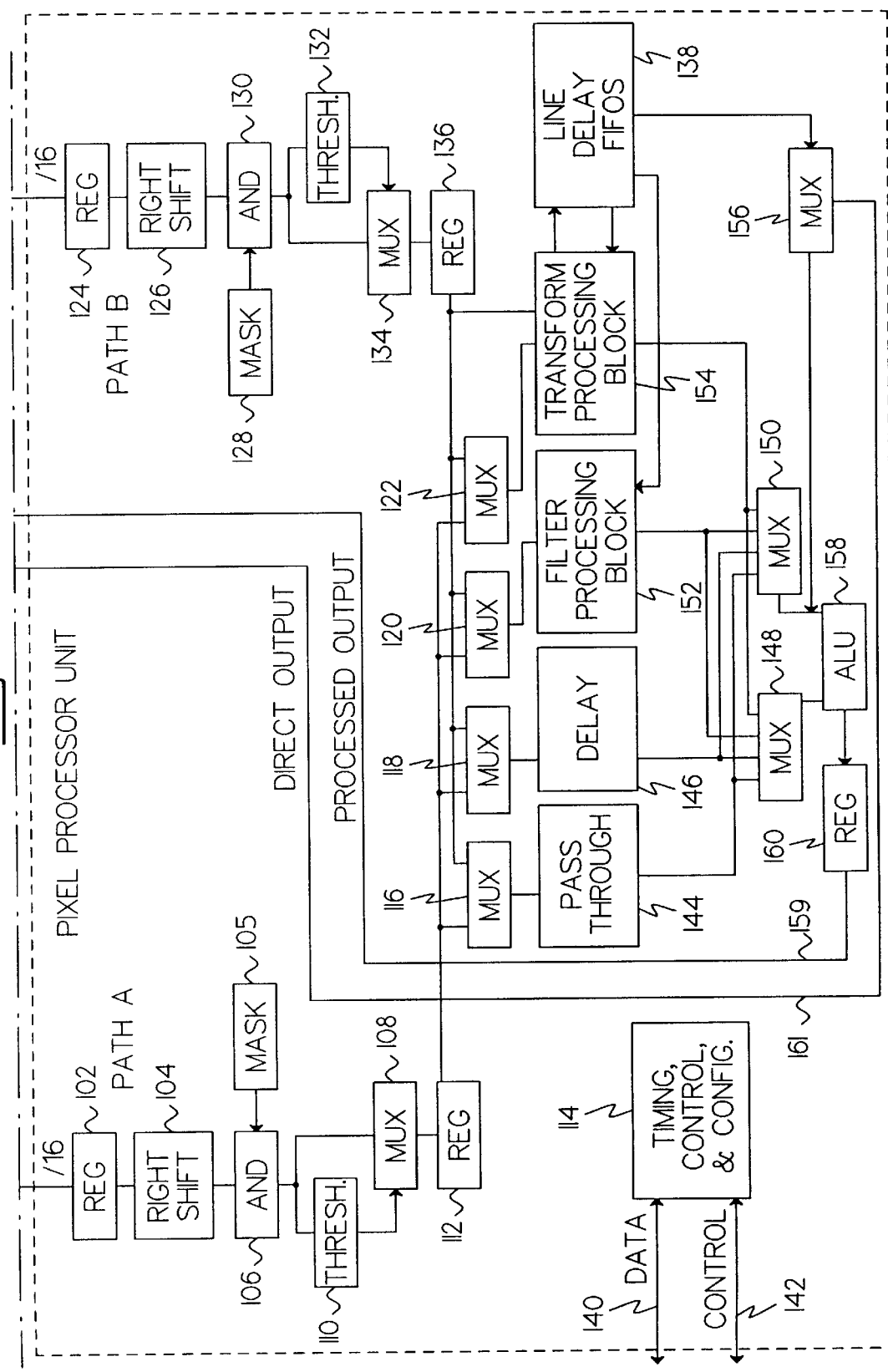
FIG. 5 shows the apparatus of the invention to perform pixel processing.

Now refer to FIG. 5 which shows the apparatus of the invention to perform pixel processing. The pixel processing unit 96 is comprised of a multiplexer and bi-directional control module 98. The multiplexer and bi-directional control module 98 provides data to the image input/output lines 94. The image input/output lines comprises eight address controller interfaces, two pixel processing interfaces, one feature processing unit interface, and one image bus interface.

The pixel processing unit 96 has two data paths from the multiplexer and bi-directional control module 98 as an output and two paths as an input to the multiplexer and bi-directional control module 98. The first path provides register 102 with data. Register 102 provides shift register 104 with data. Data from register 104 provides data to logical AND 106 with a mask 105. The output of logical AND 106 is transmitted to a thresholder 110. The output of thresholder 110 is multiplexed with the output of the logical AND 106 in multiplexer 108 and the output of the multiplexer 108 is registered in register 112. The output of the register is provided to four multiplexers 116, 118, 120 and 122.

In a second output path from the multiplexer and bi-directional module 98, the data, which in one example can be 16 bits, is provided to register 124. The output of register 124 is provided to right shift register 126. A mask 128 provides data to logical AND 130 that logical ANDs the mask 128 with the result of the right shift. Data from logical AND 130 is thresholded by thresholder 132 and both the data from the logical AND 130 and thresholder 132 is provided to multiplexer 134. The output of the multiplexer 134 provides data to register 136. The output of register 136 is provided to four multiplexers, MUXes 116, 118, 120, and 122.

The four multiplexers, MUXes 116, 118, 120 and 122 receive data from both register 112 and register 136. The output of MUX 116 is passed through 144 to multiplexers 148 and 150. The output of MUX 118 is delayed by delay 146. The output of the delay 146 comprises the second input of MUX 148 and MUX 150. The output of the MUX 120 is provided to a filter processing block which also provides data to MUX 148 and MUX 150 and the output of MUX 122 is provided to the transform processing block which also receives data from register 136. The transform processing module 154 provides MUX data to MUX 148 and MUX 150. Line delay FIFO 138 provides a FIFO buffer for data from the transform processing module 154 which receives data from register 136 and sends the delayed data both to the transform processing module 154 and the filter processing block 152. The output of the delay in FIFO is also sent to MUX 156. The output of MUX 156 and MUX 150 is provided to arithmetic processing unit 158. The output of MUX 148 is provided to arithmetic processing unit 158. The output of ALU operation is provided to register 160, which provides the processed output 159. MUX 156 provides output 161 which provides the direct output which is also an input to arithmetic processing unit 158.

Figure 6:
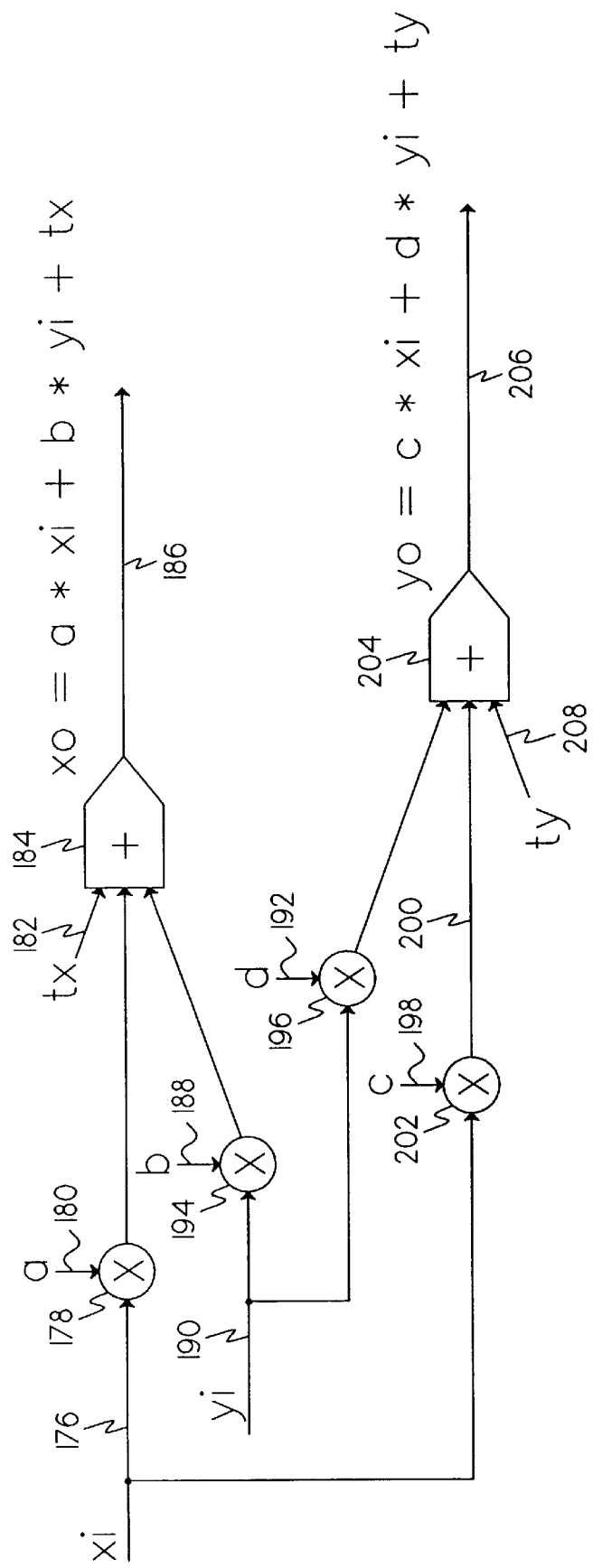
FIG. 6 shows a schematic diagram of part of the address controller of the invention.

Now refer to FIG. 6 which shows the address calculation feature of the address controller architecture of the method and apparatus of the invention. Addresses X-dimension of a 2D image xi is sent on signal line 176 to multiplier 178. Coefficient a is sent on signal line 180. The output of multiplier 178 is sent to summer gate 184. The y pixel coordinate yi is sent on signal lines 190 which is provided to multiplier 194. Multiplier 194 multiplies coefficient b on signal lines 188 by the y pixel coordinate 190. The output of multiplier 188 is also provided to summer 184. X coordinate offset tx, a constant, on signal lines 182 is provided also to summer 184. The output of the summer 184 is thus the coefficient "a" times the x pixel coordinate xi plus coefficient b times the yi pixel coordinate 190 plus an offset tx signal 182. This output is provided on address lines 186. Y pixel coordinate 190 is also provided to multiplier 196 which multiplies the y coordinate on signal lines 190 by coefficient d on signal line 192. The output of multiplier 196 is sent to summer 204. The xi pixel coordinate 176 is provided to multiplier 202 which multiplies the x pixel coordinate xi on line 176 by coefficient c on signal lines 198. The multiplier 202 has an output 200 which is sent to summer 204. Y offset ty 208 is also provided to summer 204. The output of summer 204 is provided on signal line 206 as a constant C times the x pixel coordinate xi plus constant d times the y pixel coordinate yi plus constant ty.

The address controller 164 of the invention sequentially addresses the input image by systematically incrementing the address index one dimension at a time. The address output sequence can be flexibly controlled by the address controller to achieve desirable geometric transformations between the input coordinates addresses 165 and output coordinate addresses 167. Even though a two-dimensional architecture is disclosed, those skilled in the art will recognize that the invention can be generalized to three or higher dimensions.

In this invention, the spatial transformation from the input coordinate addresses 165 to the output coordinate addresses 167 can be specified as a spatial linear transformation followed by a translation. (xi, yi) represents an X-Y pixel location of the input image and (xo, yo) represents a X-Y pixel location of the output image.

The address controller performs the following transformation:

$$xo = ax + by + tx$$

$$yo = cx + dy + ty$$

where a, b, c, d are transformation parameters and tx and ty are translations in x and y.

The architecture of the invention is thus very flexible and supports any linear transformation in coordinate space. Examples of many popular geometrical transformations are shown as follows:

1. Translation: a=1, b=0, c=0, d=1, tx=$k_1$, ty+$k_2$
2. Scaling: a=fx, b=0, c=0, d=fx, tx=0, ty=0. Where fx and fy are scaling factors. When fx (fy)<1, the X dimension (Y dimension) is compressed. When fx (fy)>1, the X dimension (Y dimension) is expanded.
3. Horizontal flip: a=−1, b 32 0, c=0, d=1, tx=Nx, ty=0. Where Nx is the total number of columns of the input image.
4. Vertical flip: a=1, b=0, c=0, d=−1, tx=0, ty=Ny. Where Ny is the total number of rows of the input image.
5. Transpose: a=0, b=1, c=1, d=0, tx=0, ty=0.
6. Horizontal skew: a=1, b=−tanθ, c=0, d=1, tx=0, ty=0.
7. Vertical skew: a=1, b=0, c=−tanθ, d=1, tx=0, ty=0.
8. Rotate: a=cosθ, b=−sinθ, c=+sinθ, d=cosθ, tx=0, ty=0.

In one embodiment, higher data precision is required for intermediate results before the conversion into (xo, yo). To scan the input image in a raster scanning fashion, xi will increment to sequentially address each row of the image and yi will increment by 1 while xi will reset to 0 after the scanning of an entire row.

The reduced instruction processing set comprises the following operations:

1. Point operations,
2. Histogram accumulation operations,
3. Connectivity analysis operations,
4. Neighborhood label propagation operations, and
5. Decomposable filtering operations.

Multidimensional implementation of the above operations can be accomplished by multiple passes of one dimensional operations.

Multiple dimensional point operations can be completely implemented in one-dimensional scanning of one or multiple images. Typical operations include:

Arithmetic: "+", "−", "*", "/", and look up tables for functions such as absolute value, power, invert, trigometric functions, logarithms, etc.

Relational: "=", ">", "<", "≧", "≦", "≠", etc.

Logical: AND, OR, NOT, XOR, NAND, NOR, XNOR, etc.

A histogram of a multidimensional data set can be implemented by scanning the data set into a one-dimensional format for indexing and accumulation operations. The resulting histograms are one-dimensional in nature. If the histogram profiles are properly quantized and stored in the same memory all the one-dimensional operations can be applied to the histogram profiles.

Connected components and labeling operations can be implemented in a one-dimensional scanning, pipelined, architecture. This operation can be generalized for multidimensional processing. As shown in FIG. 13, multidimensional connected components feature extraction processes can be implemented in a one dimensional scanning fashion. The scan direction is indicated by 280 shown moving across an image with labels "1", "2", "3" and "5". Scanning proceeding across the label boundary 290 will logically connect all label positions labeled "2" to positions labeled "1". Further scanning could encounter boundary such as 291 where a label "5" is found adjacent to label "1" in which case label "5" will then be logically connected to all positions labeled "1". Further scanning can encounter a boundary condition such as 293 which will logically connect all positions labeled "3" with all positions labeled "5" which have previously been connected to label "1" making all positions labeled "5", "3", "2" and "1" logically connected because of detected adjacencies.

Neighborhood label propagation operations such as distance transformations and semi-distance transformation can be implemented in a one-dimensional scanning format.

Many multi-dimensional linear or nonlinear filters can be decomposed into multiple convolutions of one-dimensional filters. A three dimensional decomposable filter can be described as:

$$F(x, y, z) = F1(x) \cdot F2(y) \cdot F3(z).$$

Two types of filters are decomposable and can be easily implemented in the RIS architecture. The first type is an iterative delay-operation filter and the second type is an iterative uniform filtering architecture.

Figure 7:
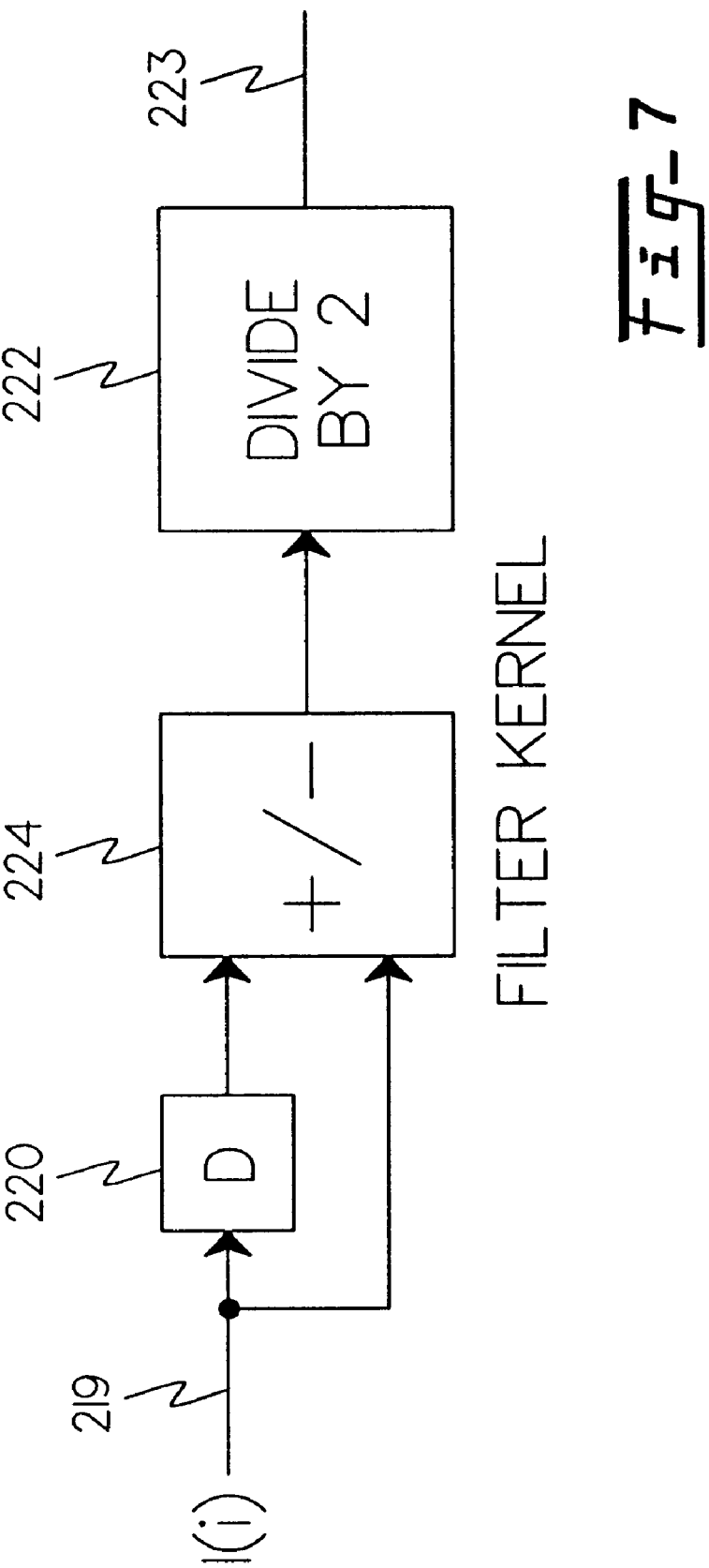
FIG. 7 shows the basic processing unit of the iterative delay-operation filter.

A linear filter of this type is separable, normalized, symmetric, and equal contribution. The basic processing unit includes a delay unit and an adder/subtracter and a bit shifter that shifts the result to the right by one bit to achieve the divide by two effect as shown in FIG. 7.

Figure 8:
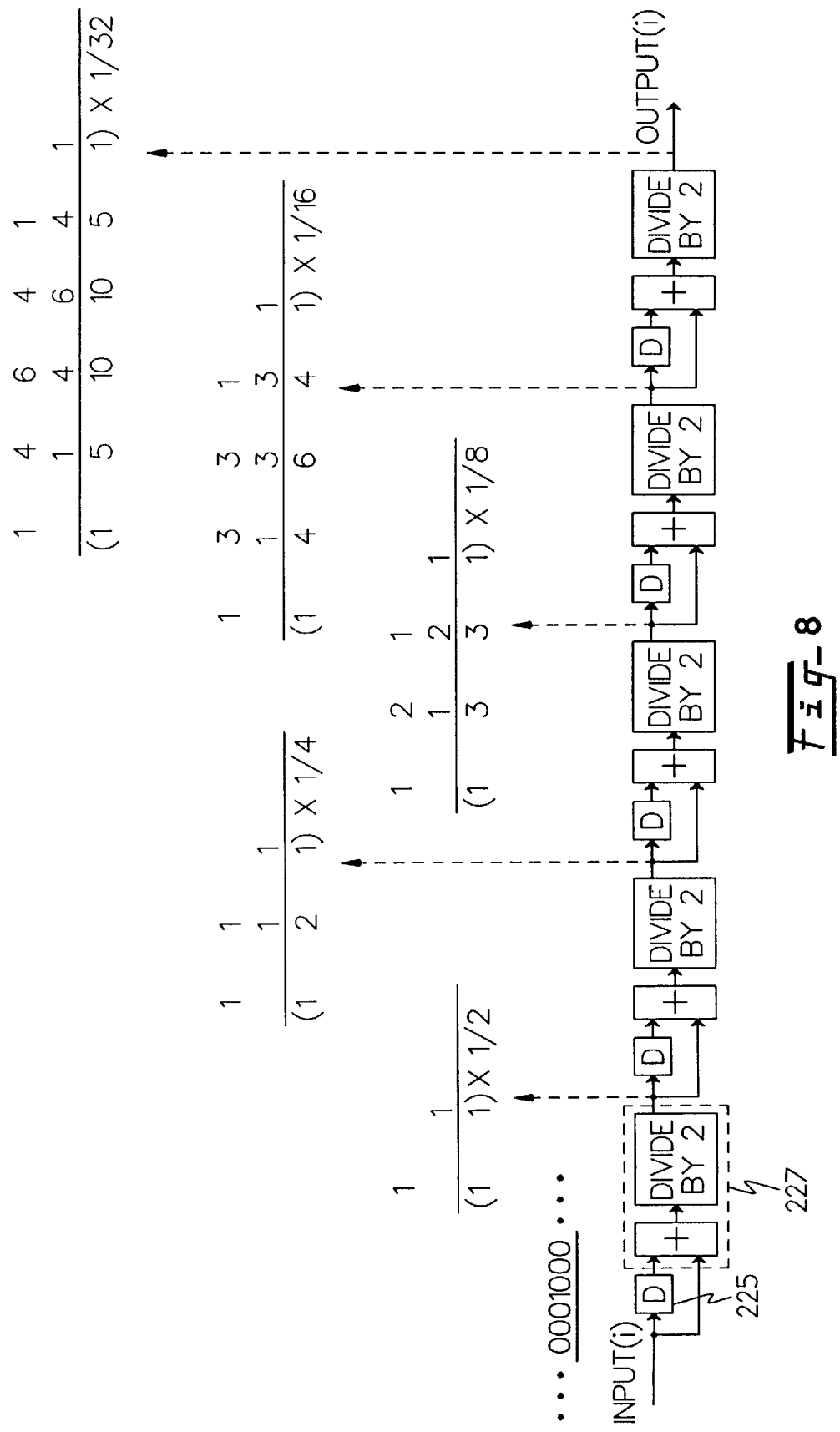
FIG. 8 shows an example of Gaussian filtering by five stages of the iterative delay-addition filter.

FIG. 8 shows an example of Gaussian filtering by five stages of the iterative delay-addition filter. The original signal is delayed 225 and the delayed result is added to 227 from the original signal. This process is repeated five times.

Figure 9:
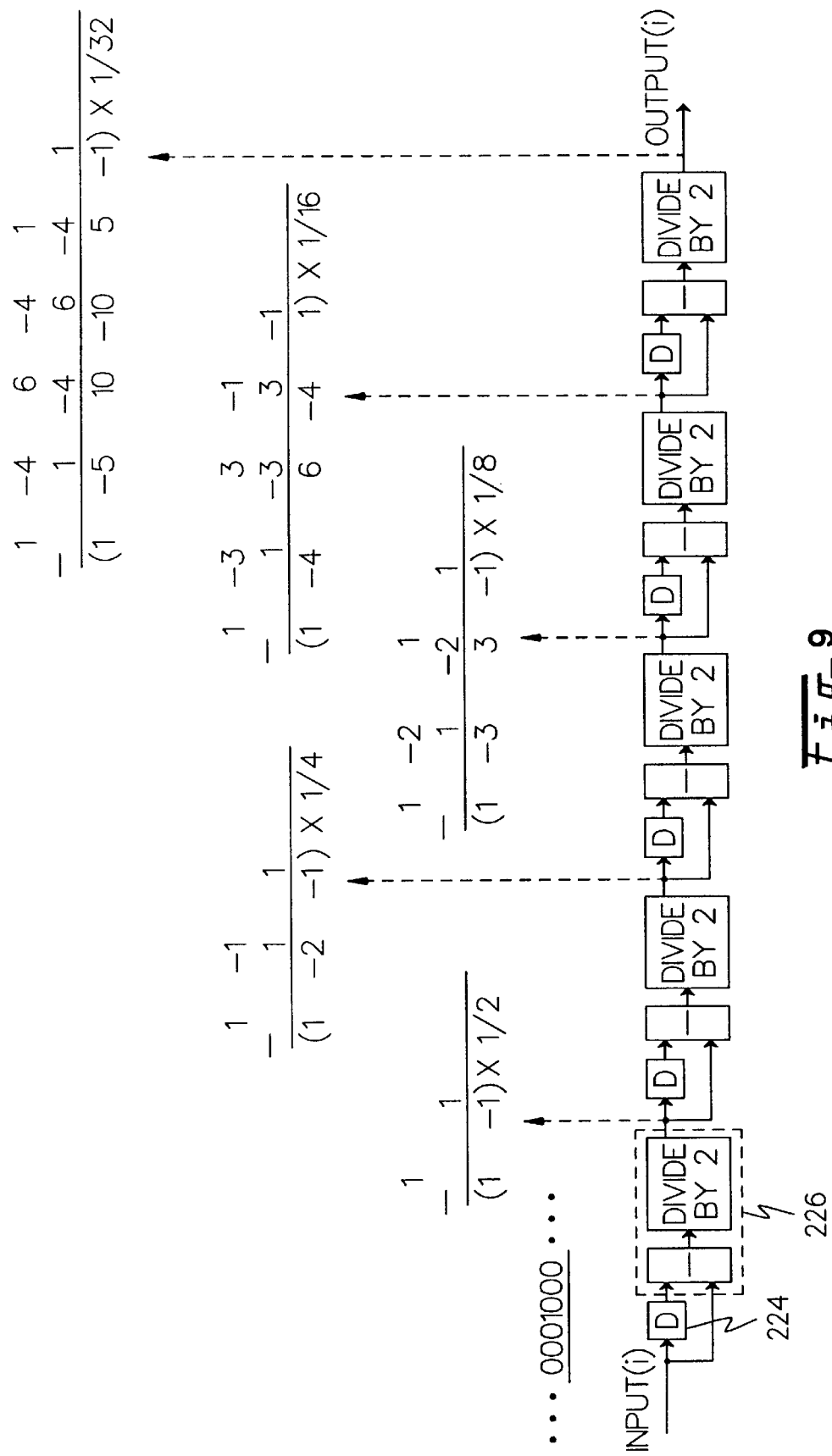
FIG. 9 shows difference (Laplacian) filtering by five stages of the iterative delay-subtraction filter.

FIG. 9 shows difference (Laplacian) filtering by five stages of the iterative delay-subtraction filter. The original signal is delayed 224 and the delayed result is subtracted 226 from the original signal. This process is repeated five times.

Note that the delay elements are programmable. Different delays at different stages will produce different Gaussian or Laplacian kernels. Another one-dimensional filter can be applied to the filtered image and scanning the image into different scanning directions: horizontal, vertical, Z direction, diagonal, general directions, among others, to create a multidimensional filter.

Figure 10:
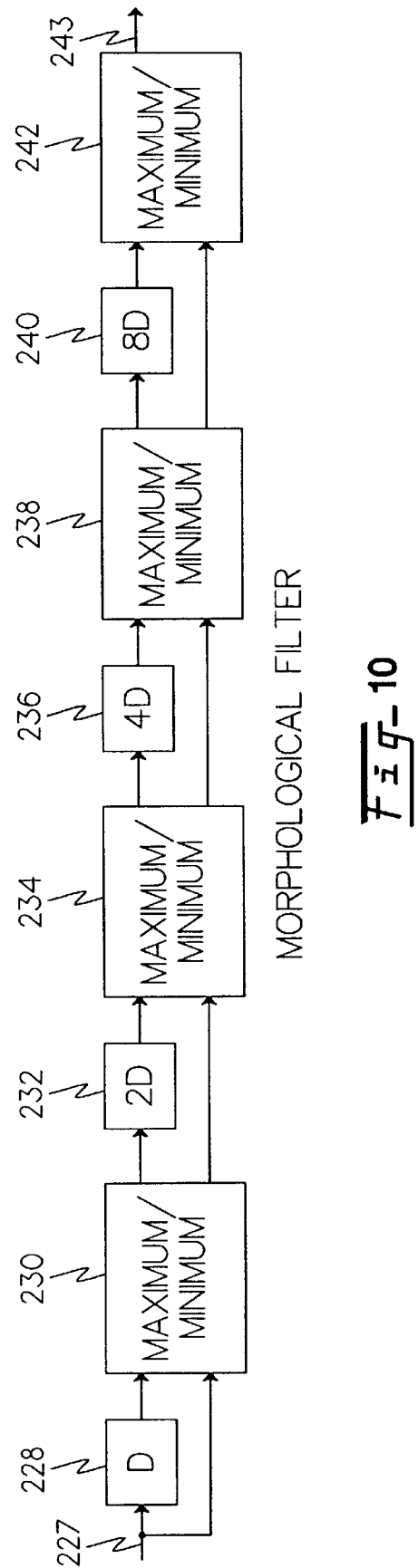
FIG. 10 shows a morphological filter with four stages of iterative delay with power two extension.

FIG. 10 shows a morphological filter with four stages of iterative delay with power two extension. This is repeated until the delay is eight times in delay 240.

Figure 11A:
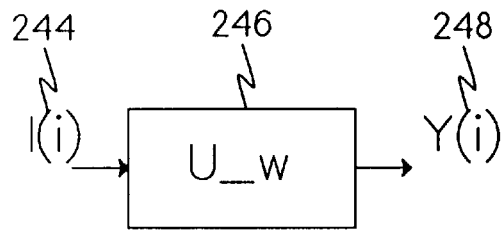
FIG. 11 shows a method of the invention to implement a uniform filter.
Figure 11B:
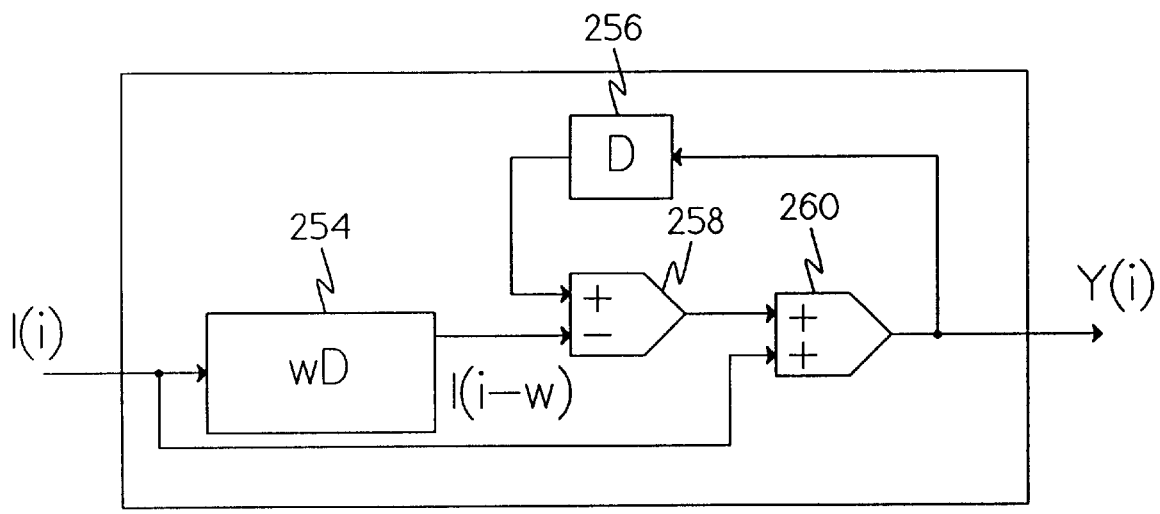
Figure 12:
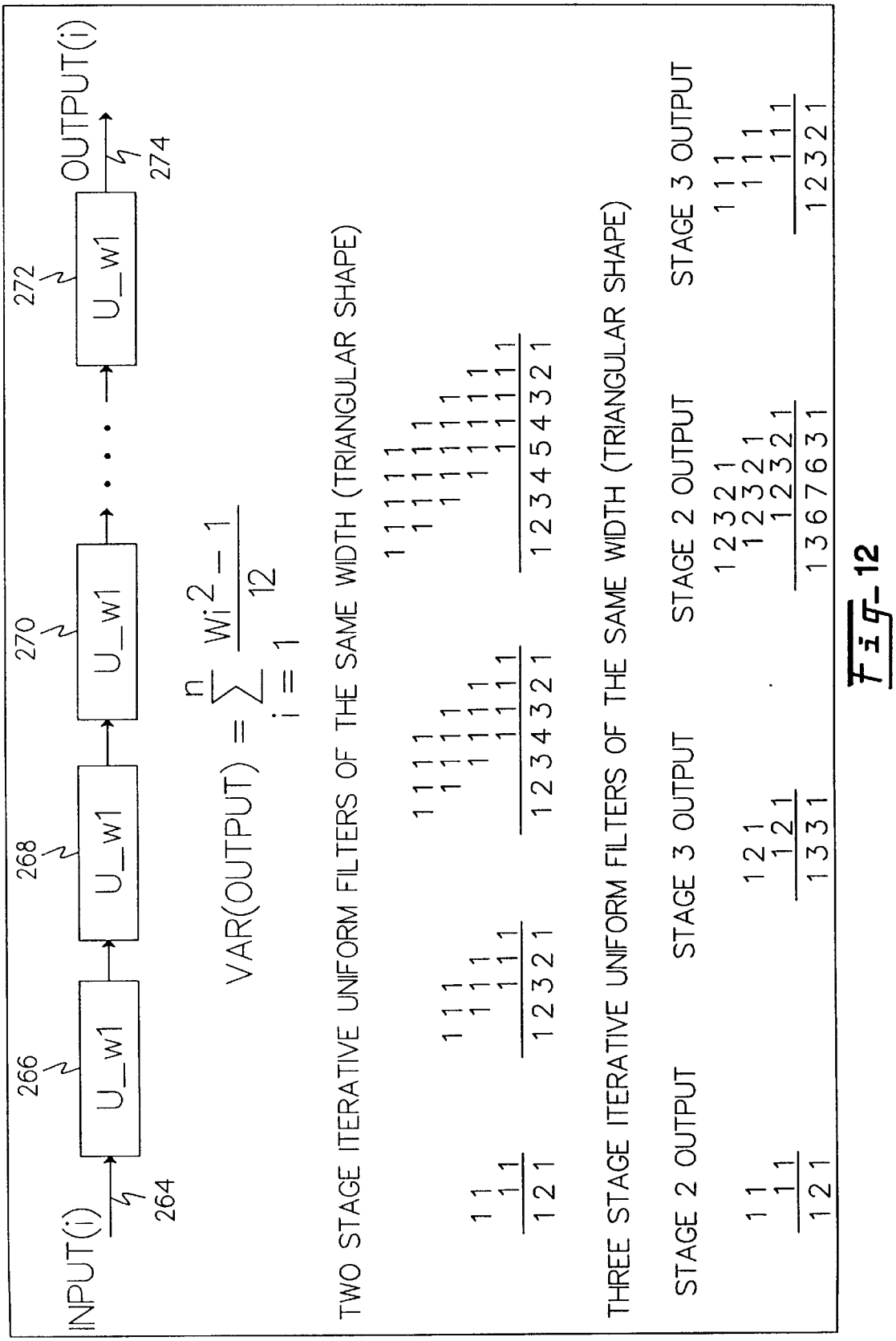
FIG. 12 shows the connection and cascade of multistage uniform filters of the invention.

Similar architecture can be used to implement morphological filtering with a more efficient power of two expansion. Now refer to FIG. 11 which shows a method of the invention to implement a uniform filter. In this expansion, a delay element doubles its delay value from its previous stage as shown in FIG. 11 and can derive, up to second order moments, centroid, center of mass, volume, average density, integrated density, tilt angle, elongateness, etc. An image input 244 is provided to transfer function 246 which provides a uniform filter output Y(i) on signal line 248. In FIG. 11, the uniform transfer function is shown expanded where the input image 244 is provided to a programmable delay 254. The input image is also provided to summer 260. The output of summer 260 is fed back through the delay 256 to the summer 258 which adds the direct output of delay 256 and the inverted output of delay 254, to provide one input to summer 260. The output of summer 260 is provided as the uniform filtered output 248. The Gaussian filter implemented by the iterative delay-operation architecture is limited in its kernel shapes. An iterative uniform filter can be implemented that supports very flexible kernel shapes. The iterative uniform filter uses multiple stages of uniform filters to simulate Gaussian filters. The basic principle of this architecture is the central limit theory that states that repeated convolutions of simple non-negative functions tends to approximate a Gaussian function. A uniform filter of width w is designated as U_w. The following list shows examples of uniform kernels for different width w:

| | | | | | | |
|---|---|---|---|---|---|---|
| 1 | 1 | | | | | w = 2 |
| 1 | 1 | 1 | | | | w = 3 |
| 1 | 1 | 1 | 1 | | | w = 4 |
| 1 | 1 | 1 | 1 | 1 | | w = 5 |
| 1 | 1 | 1 | 1 | 1 | 1 | w = 6 |

The variance of U_w, Var(U_w), can be determined as $$Var(U\_w) = (w^2 - 1)/12.$$

The uniform filter U_w can be implemented using the following equation:

$$Y(i) = Y(i-1) + I(i) - I(i-w)$$

where Y(i) is the output of U_w at i and I(i) is the input data at i. The implementation architecture is shown in FIG. 11.

The uniform filters can be cascaded to simulate Gaussian filter of variance:

$$Var(G) = \sum_{i=1}^{n} (w_i^2 - 1)/12$$

for n stage filters. Where wi is the width of stage i. FIG. 9 shows the kernels of two stage iterative uniform filters of widths from two to five and the kernels of three stage iterative uniform filters of widths from two to three.

The following patents and patent applications are incorporated by reference hereto:

U.S. Pat. No. 5,787,188, issued Jul. 28, 1998, which is a file wrapper continuation of abandoned U.S. patent application Ser. No. 07/838,064, entitled "Method For Identifying Normal Biomedical Specimens", by Alan C. Nelson et al., filed Feb. 18, 1992.

U.S. Pat. No. 5,528,703, issued Jun. 18, 1996, entitled "Method For Identifying Objects Using Data Processing Techniques", by S. J. Lee et al., filed Feb. 18, 1992.

U.S. Pat. No. 5,315,700, issued May 24, 1994, entitled "Method And Apparatus For Rapidly Processing Data Sequences", by Richard S. Johnston et al.

U.S. Pat. No. 5,361,140, issued Nov. 1, 1994, entitled "Method and Apparatus for Dynamic Correction of Microscopic Image Signals" by Jon W. Hayenga et al.

U.S. Pat. No. 5,912,699, issued Jun. 15, 1999, entitled "Method and Apparatus for Rapid Capture of Focused Microscopic Images" to Hayenga, et al., which is a continuation-in-part of abandoned U.S. patent application Ser. No. 07/838,063 filed on Feb. 18, 1992.

U.S. patent application No. 5,757,954, issued May 26, 1998, to Kuan et al. entitled, "Field Prioritization Apparatus and Method."

Pending U.S. patent application Ser. No. 08/309,061, filed Sep. 20, 1994, to Wilhelm et al., entitled "Apparatus for Automated Identification of Cell Groupings on a Biological Specimen."

Pending U.S. patent application Ser. No. 08/309,116, filed Sep. 20, 1994, to Meyer et al. entitled "Apparatus for Automated Identification of Thick Cell Groupings on a Biological Specimen."

U.S. Pat. No. 5,787,189, issued Jul. 28, 1998, which is a file wrapper continuation of abandoned U.S. patent application Ser. No. 08/309,115 to Lee et al. entitled "Biological Analysis System Self Calibration Apparatus."

U.S. Pat. No. 5,828,776, issued Oct. 27, 1998, which is a file wrapper continuation of abandoned U.S. patent application Ser. No. 08/308,992, to Lee et al. entitled "Apparatus for Identification and Integration of Multiple Cell Patterns."

U.S. Pat. No. 5,627,908, issued May 6, 1997, entitled "A Method for Cytological System Dynamic Normalization" by Lee et al.

U.S. Pat. No. 5,638,459, issued Jun. 10, 1997, entitled "Method and Apparatus for Detecting a Microscope Slide Covers tip" to Rosenlof et al.

U.S. Pat. No. 5,566,249, issued Oct. 15, 1996, to Rosenlof et al. entitled "Apparatus for Detecting Bubbles in Coverslip Adhesive."

Allowed U.S. patent application Ser. No. 08/309,931, filed Sep. 20, 1994, to Lee et al. entitled "Cytological Slide Scoring Apparatus."

U.S. Pat. No. 5,978,497, issued Nov. 2, 1999, to Lee et al. entitled "Apparatus for the Identification of Free-Lying Cells."

U.S. Pat. No. 5,740,269, issued Apr. 14, 1998, to Oh et al. entitled "A Method and Apparatus for Robust Biological Specimen Classification."

U.S. Pat. No. 5,715,327 issued Feb. 3, 1998, to Wilhelm et al. entitled "Method and Apparatus for Detection of Unsuitable Conditions for Automated Cytology Scoring."

U.S. Pat. No. 5,797,130, issued Aug. 18, 1998, to Nelson et al., entitled "Method For Testing Proficiency in Screening Images of Biological Slides", which is a file wrapper continuation of abandoned U.S. patent application Ser. No. 08/153,293 entitled "Method and Apparatus for Testing Proficiency in Screening Images", filed Nov. 16, 1993.

U.S. Pat. No. 5,699,794, issued Dec. 23, 1997, to Fleck, entitled "Apparatus for Automated Urine Sediment Sample Handling."

Pending U.S. patent application Ser. No. 08/485,182 to Lee et al., filed Jun. 7, 1995, entitled "Interactive Method and Apparatus for Sorting Biological Specimens."

U.S. Pat. No. 5,647,025, issued Jul. 8, 1997 to Frost et al., entitled "Automatic Focusing of Biomedical Specimens Apparatus".

U.S. Pat. No. 5,677,762, issued Oct. 14, 1997, to Ortyn et al., which is a file wrapper continuation of abandoned U.S. patent application Ser. No. 08/309,064 entitled "Apparatus for Illumination Stabilization and Homogenization."

U.S. Pat. No. 5,875,258, issued Feb. 23, 1999, to Ortyn et al., which is a file wrapper continuation of abandoned U.S. patent application Ser. No. 08/309,249 entitled "Biological Specimen Analysis System Processing Integrity Checking Apparatus."

U.S. Pat. No. 5,715,326, issued Feb. 3, 1998 to Ortyn entitled "Cytological System Illumination Integrity Checking Apparatus and Method."

U.S. Pat. No. 5,581,631, issued Dec. 3, 1996 to Ortyn et al., entitled "Cytological System Image Collection Integrity Checking Apparatus."

U.S. Pat. No. 5,557,097, issued Sep. 17, 1996, to Ortyn et al., entitled "Cytological System Autofocus Integrity Checking Apparatus."

U.S. Pat. No. 5,499,097, issued Mar. 12, 1996 to Ortyn et al., entitled "Method and Apparatus for Checking Automated Optical System Performance Repeatability."

U.S. Pat. No. 5,692,066, issued Nov. 25, 1997, to Lee et al., entitled "Method and Apparatus for Image Plane Modulation Pattern Recognition."

U.S. Pat. No. 5,799,101, issued Aug. 25, 1998, which is a file wrapper continuation of abandoned U.S. patent application Ser. No. 08/315,719, filed Sep. 30, 1994, by Lee et al., entitled "Method and Apparatus for Highly Efficient Computer Aided Screening."

U.S. Pat. No. 5,787,208, issued Jul. 28, 1998, to Oh et al., entitled "Image Enhancement Method and Apparatus."

U.S. Pat. No. 5,642,441, issued Jun. 24, 1997, to Riley et al., entitled "Apparatus and Method for Measuring Focal Plane Separation."

U.S. Pat. No. 5,625,706, issued Apr. 29, 1997 to Lee et al., entitled "Method and Apparatus for Continuously Monitoring and Forecasting Slide and Specimen Preparation for a Biological Specimen Population."

U.S. Pat. No. 5,745,601, issued Apr. 28, 1998, to Lee et al., entitled "Robustness of Classification Measurement Apparatus and Method."

U.S. Pat. No. 5,671,288, issued Sep. 23, 1997 to Wilhelm et al., entitled "Method and Apparatus for Assessing Slide and Specimen Preparation Quality."

U.S. Pat. No. 5,621,519, issued Apr. 15, 1997 to Frost et al., entitled "Imaging System Transfer Function Control Method and Apparatus."

U.S. Pat. No. 5,619,428, issued Apr. 8, 1997 to Lee et al., entitled "Method and Apparatus for Integrating An Automated System to a Laboratory."

U.S. Pat. No. 5,781,667, issued Jul. 14, 1998, to Schmidt et al., entitled "Apparatus for High Speed Morphological Processing."

U.S. Pat. No. 5,642,433, issued Jun. 24, 1997 to Lee et al., entitled "Method and Apparatus for Image Contrast Quality Evaluation."

U.S. Pat. No. 5,867,610, issued Feb. 2, 1999, which is a divisional of U.S. Pat. No. 5,710,842, issued Jan. 20, 1998, to Lee, which is a divisional of U.S. Pat. No. 528,703, entitled "Method for Identifying Objects Using Data Processing Techniques."

U.S. Pat. No. 5,937,103, issued Aug. 10, 1999 to Oh et al., entitled "Method and Apparatus for Alias Free Measurement of Optical Transfer Function."

U.S. Pat. No. 5,654,535, issued Aug. 5, 1997, which is a divisional of U.S. Pat. No. 5,557,097, issued Sep. 17, 1996, to Ortyn et al., entitled "Cytological System Autofocus Integrity Checking Apparatus."

U.S. Pat. No. 5,812,692, issued Sep. 22, 1998 to Rosenlof et al., which is a divisional of U.S. Pat. No. 5,638,459, issued Jun. 10, 1997, entitled "Method and Apparatus for Detecting a Microscope Slide Coverslip."

Pending U.S. patent application Ser. No. 08/767,457 to Lee et al., filed Dec. 16, 1996 entitled "Method and Apparatus for Efficacy Improvement in Management of Cases With Equivocal Screening Results."

U.S. Pat. No. 5,892,218 issued Apr. 6, 1999, to Ortyn et al., which is a divisional of U.S. Pat. No. 5,654,535, issued Aug. 5, 1997, entitled "Cytological System Autofocus Integrity Checking Apparatus."

U.S. Pat. No. 5,760,387, issued Jun. 2, 1998 to Ortyn et al., which is a divisional of U.S. Pat. No. 5,654,535, issued Aug. 5, 1997,, entitled "Cytological System Autofocus Integrity Checking Apparatus."

U.S. Pat. No. 5,841,124, issued Nov. 24, 1998 to Ortyn et al., which is a divisional of U.S. Pat. No. 5,654,535, issued Aug. 5, 1997, entitled "Cytological System Autofocus Integrity Checking Apparatus."

U.S. Pat. No. 5,763,871, issued Jun. 9, 1998, to Ortyn et al., which is a divisional of U.S. Pat. No. 5,654,535, issued Aug. 5, 1997, entitled "Cytological System Autofocus Integrity Checking Apparatus."

U.S. Pat. No. 5,877,489, issued Mar. 2, 1999, to Ortyn et al., which is a divisional of U.S. Pat. 5,654,535, issued Aug. 5, 1997, entitled "Cytological System Autofocus Integrity Checking Apparatus."

U.S. Pat. No. 5,883,982, issued Mar. 16, 1999, which is a divisional of U.S. Pat. No. 5,642,441, issued Jun. 24, 1997, to Riley et al., entitled "Apparatus and Method for Measuring Focal Plane Separation."

Pending U.S. patent application Ser. No. 08/888,115, filed Jul. 3, 1997, entitled "Method and Apparatus for Maskless Semiconductor and Liquid Crystal Display Inspection" by Lee et al.

Pending U.S. patent application Ser. No. 08/888,120, filed Jul. 3, 1997, entitled "Method and Apparatus for A Reduced Instruction Set Architecture for Multidimensional Image Processing" by Hlayenga et al.

Pending U.S. patent application Ser. No. 08/888,119, filed Jul. 3, 1997, entitled "Method and Apparatus for Incremental Concurrent Learning in Automatic Semiconductor Wafer and Liquid Crystal Display Defect Classification" by Kuan et al.

Pending U.S. patent application Ser. No. 08/888,116, filed Jul. 3, 1997, entitled "Method and Apparatus for Semiconductor Wafer and LCD Inspection Using Multidimensional Image Decomposition and Synthesis" by Nelson et al.

All of the above patent applications and patents are incorporated herein, in their entirety, by the foregoing references thereto.

The invention has been described herein in considerable detail in order to comply with the Pat. Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An image processing apparatus comprising:
   (a) a host computer;
   (b) a plurality of field of view processors;
   (c) a system bus to connect the computer and the plurality of field of view processors;
   (d) an image disk interface connected to the system bus;
   (e) a means for acquiring an image connected to an image interface and image reformatter wherein the image interface is also connected to the system bus; and
   (f) a high speed image bus ring for connecting the plurality of field of view processors via the image interface and the image disk interface wherein the field of view processors perform multidimensional image processing, and wherein one of the field of view processors further comprises:
      (i) a first multiplier for multiplying a first image input signal by a first coefficient;
      (ii) a second multiplier for multiplying a second coefficient by a second image input signal;
      (iii) a third multiplier for multiplying a first constant by the first image input signal;
      (iv) a fourth multiplier for multiplying a second constant by the second image input signal; and
      (v) a first summer for summing the output of a first multiplier and a second multiplier and a first constant and a second summer for summing the output of the third multiplier and the fourth multiplier and a second constant.

2. The apparatus of claim 1 further comprising means for filtering and image transformation wherein the means for filtering and image transformation performs a coefficient controlled operation.

3. The apparatus of claim 2 wherein the pixel processing unit comprises a mask and thresholded image pixel processor having filter processing and transform processing.

4. The apparatus of claim 1 further comprising an iterative delay operation filter.

5. The apparatus of claim 1 further comprising an iterative delay addition filter.

6. The apparatus of claim 1 further comprising an iterative delay subtraction filter.

7. The apparatus of claim 1 further comprising an iterative delay maximum filter.

8. The apparatus of claim 1 further comprising an iterative uniform filter.

9. The apparatus of claim 1 wherein each one of the field of view processing modules comprises a plurality of pixel processing units connected through a cross point interconnective multiplexer to a plurality of image buffer memories.

10. The apparatus of claim 1 wherein a translation operation is implemented when the first coefficient is 1, the second coefficient is 0, the third coefficient is 0 and the fourth coefficient is 1, where the first constant is 0 and the second constant is 0.

11. The apparatus of claim 1 wherein the scaling operation is performed when the first coefficient is set to the scaling factor, the second coefficient is set to 0, the third coefficient is set to 0 and the fourth coefficient is set to the scaling factor.

12. The apparatus of claim 1 wherein a horizontal flip operation is performed and the first coefficient is −1, the second coefficient is 0, the third coefficient is 0 and the fourth coefficient is 1, the first constant is the total amount of columns in the input image and the second constant is 0.

13. The apparatus of claim 1 wherein a vertical flip operation is performed when the first coefficient is 1, the second coefficient is 0, the third coefficient is 0, the fourth coefficient is −1, the first constant is 0 and the second constant is the total number of rows of the input image.

14. The apparatus of claim 1 where a transpose function is performed when the first coefficient is 0, the second coefficient is 1, the third coefficient is 1, the fourth coefficient is 0, the first constant is 0 and the second constant is 0.

15. The apparatus of claim 1 wherein a horizontal skew operation is performed when the first coefficient is 1, the second coefficient is −tangent of theta, where theta is the skew angle, the third coefficient is 0, the fourth coefficient is 1, the first constant is 0 and the second constant is 0.

16. The apparatus of claim 1 wherein a vertical skew operation is performed when the first coefficient is 1, the second coefficient is 0, the third coefficient is −tangent of the vertical skew angle, the fourth coefficient is 1, the first constant is 0 and the second constant is 0.

17. The apparatus of claim 1 wherein a rotation operation is performed when the first coefficient is the cosine of the rotation angle, the second coefficient is the sine of the rotation angle, and the third coefficient is −sine of the rotation angle, the fourth coefficient is the cosine of the rotation angle, the first constant is 0 and the second constant is 0.

* * * * *